(12) United States Patent
Barendrecht

(10) Patent No.: US 9,759,300 B2
(45) Date of Patent: Sep. 12, 2017

(54) TRANSMISSION FOR A WHEELED VEHICLE WITH A WALKING DRIVER, AND WHEELED VEHICLE EQUIPPED WITH SUCH A TRANSMISSION

(71) Applicant: FRANCE REDUCTEURS, Les Herbiers (FR)

(72) Inventor: Wouter Barendrecht, Cholet (FR)

(73) Assignee: FRANCE REDUCTEURS, Les Herbiers (FR)

( * ) Notice: Subject to any disclaimer, the term of this patent is extended or adjusted under 35 U.S.C. 154(b) by 0 days.

(21) Appl. No.: 14/785,036

(22) PCT Filed: Apr. 8, 2014

(86) PCT No.: PCT/FR2014/050836
§ 371 (c)(1),
(2) Date: Oct. 16, 2015

(87) PCT Pub. No.: WO2014/174173
PCT Pub. Date: Oct. 30, 2014

(65) Prior Publication Data
US 2016/0084361 A1    Mar. 24, 2016

(30) Foreign Application Priority Data
Apr. 23, 2013 (FR) ...................... 13 53703

(51) Int. Cl.
*F16H 48/12* (2012.01)
*F16H 37/08* (2006.01)
(Continued)

(52) U.S. Cl.
CPC ..... *F16H 37/0813* (2013.01); *A01D 34/6806* (2013.01); *A01D 34/6812* (2013.01);
(Continued)

(58) Field of Classification Search
None
See application file for complete search history.

(56) References Cited

U.S. PATENT DOCUMENTS

| 479,192 A | 7/1892 | Leele |
| 3,306,406 A * | 2/1967 | Poliseo ................... F16D 41/22 192/104 R |

(Continued)

FOREIGN PATENT DOCUMENTS

EP    1198981    4/2002

OTHER PUBLICATIONS

Search Report dated 2014.

*Primary Examiner* — Dirk Wright
(74) *Attorney, Agent, or Firm* — Ipsilon USA, LLP

(57) ABSTRACT

A transmission for a walk-behind wheeled vehicle, the transmission being of the type including at least one casing (2) housing a driver member (3), equipped with rotary drive motor means (4), a rotary driven member (5), two wheel drive shafts (6A, 6B) in alignment, two clutch mechanisms (8) each of which is disposed between the driven member (5) and a wheel drive shaft (6A; 6B), each clutch mechanism (8) being activated by the driven member (5) being driven in rotation forwards, and deactivatable by the wheel drive shaft (6A; 6B) with which it co-operates being driven in rotation forwards, when the speed of rotation of the wheel drive shaft (6A, 6B) is greater than the speed of rotation of the driven member (5). The rotary drive motor means (4) for driving the driver member (3) in rotation are motor means that can be controlled to rotate in two directions of rotation, and each clutch mechanism (8) is of the type that is deactivatable merely by the driven member (5) being driven in rotation in the backwards direction.

10 Claims, 9 Drawing Sheets

(51) Int. Cl.
*F16D 41/04* (2006.01)
*A01D 34/68* (2006.01)
*F16H 48/19* (2012.01)
*A01D 34/69* (2006.01)
*F16H 48/16* (2006.01)

(52) U.S. Cl.
CPC ............ *A01D 34/69* (2013.01); *F16D 41/04* (2013.01); *F16H 48/19* (2013.01); *F16H 48/16* (2013.01)

(56) References Cited

U.S. PATENT DOCUMENTS

| | | | | |
|---|---|---|---|---|
| 7,210,567 | B2 * | 5/2007 | Cibien | F16D 13/025 |
| | | | | 192/48.8 |
| 7,665,589 | B2 * | 2/2010 | Blanchard | A01D 34/69 |
| | | | | 192/46 |
| 7,669,702 | B2 * | 3/2010 | Blanchard | A01D 34/69 |
| | | | | 180/76 |
| 7,850,555 | B2 * | 12/2010 | Keane | A01D 69/08 |
| | | | | 474/11 |
| 8,671,800 | B2 * | 3/2014 | Cibien | A01D 69/06 |
| | | | | 475/228 |
| 9,456,546 | B2 * | 10/2016 | Blanchard | A01D 34/69 |
| 2002/0178708 | A1 | 12/2002 | Williams et al. | |
| 2006/0289225 | A1 | 12/2006 | Blanchard | |
| 2007/0000348 | A1 | 1/2007 | Blanchard | |

* cited by examiner

TRANSMISSION FOR A WHEELED VEHICLE WITH A WALKING DRIVER, AND WHEELED VEHICLE EQUIPPED WITH SUCH A TRANSMISSION

RELATED APPLICATIONS

This application is a National Phase Application of PCT/FR2014/050836, filed on Apr. 8, 2014, which in turn claims the benefit of priority from French Patent Application No. 13 53703 filed on Apr. 23, 2013, the entirety of which are incorporated herein by reference.

BACKGROUND

Field of the Invention

The present invention relates to a transmission for a walk-behind wheeled vehicle, and the present invention also relates to a wheeled vehicle equipped with such a transmission.

The invention relates more particularly to a transmission for a walk-behind wheeled vehicle, the transmission being of the type including at least one preferably non-rotary casing at least partially housing a driver member, such as an inlet shaft, equipped with rotary drive motor means, a rotary driven member, such as a toothed wheel, continuously engaging with the motor driver member, wheel drive means for driving both wheels of a single pair of wheels of the vehicle, said wheel drive means comprising a wheel drive shaft made in one piece or made up of at least two wheel drive shaft segments in alignment, each of which is suitable for driving a respective wheel of the single pair of wheels of the vehicle, and a clutch mechanism disposed between the wheel drive shaft or each of the wheel drive shaft segments and the driven member, the or each clutch mechanism being activated by the driven member being driven in rotation in a "forwards" first rotary drive direction, and deactivatable by the wheel drive shaft or the wheel drive shaft segment with which it co-operates being driven in rotation forwards, when the speed of rotation of the wheel drive shaft or of the wheel drive shaft segment is greater than the speed of rotation of the driven member, the wheel drive shaft or each wheel drive shaft segment being free to turn in either of its directions of rotation when the corresponding clutch mechanism is in the deactivated state.

Description of Related Art

Such transmissions incorporate an "automatic" clutch that, in order to operate, does not need any dedicated control member, such as a fork, as is necessary in conventional clutches.

In such a transmission, while the driven member is being driven in rotation in a "forwards" direction, the clutch mechanism is deactivated when the speed of rotation of the wheel drive shaft is greater than the speed of rotation of the driven member.

Due to the inertia of the vehicle, that characteristic generally enables the clutch mechanisms to be deactivated automatically when the vehicle is stopped.

When the vehicle is stopped, the driven member ceases to turn and the wheel drive shaft or the wheel drive shaft segments for driving the wheels of the vehicle being entrained by the inertia of the vehicle causes the clutch mechanism to be deactivated, then making it easy for the vehicle to be moved over the ground, forwards or backwards.

However, such conditions are not satisfied when the vehicle stops suddenly or on a gradient.

Under such circumstances, the clutch mechanisms remain activated and it is difficult or indeed impossible to move the vehicle backwards by wheeling it over the ground. The driver then needs to have the instinctive reaction of moving the vehicle forwards until the drive means are deactivated so as then to be able to wheel the vehicle backwards.

In addition, and until now, the coupling between the drive outlet shaft of the motor means and the driven member has been voluminous.

OBJECTS AND SUMMARY

An object of the present invention is thus to propose a transmission of the above-mentioned type that is of a design making it easy for the clutch mechanisms to be deactivated, including when said vehicle stops suddenly or on a gradient.

Another object of the present invention is to propose a transmission that is of a design making it possible to obtain an overall assembly that is compact.

To these ends, the invention provides a transmission for a walk-behind wheeled vehicle, the transmission being of the type including at least one preferably non-rotary casing at least partially housing a driver member, such as an inlet shaft, equipped with rotary drive motor means, a rotary driven member, such as a toothed wheel, continuously engaging with the motor driver member, wheel drive means for driving both wheels of a single pair of wheels of the vehicle, said wheel drive means comprising a wheel drive shaft made in one piece or made up of at least two wheel drive shaft segments in alignment, each of which is suitable for driving a respective wheel of the single pair of wheels of the vehicle, and a clutch mechanism disposed between the wheel drive shaft or each of the wheel drive shaft segments and the driven member, the or each clutch mechanism being activated by the driven member being driven in rotation in a "forwards" first rotary drive direction, and deactivatable by the wheel drive shaft or the wheel drive shaft segment with which it co-operates being driven in rotation forwards, when the speed of rotation of the wheel drive shaft or of the wheel drive shaft segment is greater than the speed of rotation of the driven member, the wheel drive shaft or each wheel drive shaft segment being free to turn in either of its directions of rotation when the corresponding clutch mechanism is in the deactivated state, said transmission being characterized in that the rotary drive motor means for driving the driver member in rotation, and therefore for driving the driven member in rotation, are motor means that can be controlled to rotate in two directions of rotation and that are suitable not only for driving the driven member in rotation in the forwards direction, but also for driving the driven member in rotation in a "backwards" second direction that is opposite to said first direction of rotation, and in that the or each clutch mechanism is of the type that is deactivatable merely by the driven member being driven in rotation in the backwards direction.

The drawbacks observed with a prior art automatic clutch are removed by that fact that the rotary drive motor means for driving the driver member in rotation are motor means that can be controlled to rotate in two directions of rotation, i.e. in addition to being equipped with control means for causing the motor means to rotate in the direction in which the driven member is driven forwards, they are equipped with control means for causing the motor means to rotate in the direction in which the driven member is driven backwards, which control means are configured to drive the driven member in rotation backwards, and by the fact that each clutch mechanism is deactivatable at least by the driven member being driven in rotation backwards through an angular range corresponding to one turn of said member.

In order to obtain declutching, it suffices, by manual or automatic control, to cause said driven member to be driven backwards. As a result, it is possible to preserve the advantages related to having a clutch that operates automatically, without adversely affecting driving of the vehicle.

Preferably, the or each clutch mechanism is activated by the driven member being driven in rotation in a "forwards" first direction of rotation, and by at least one part of the clutch mechanism moving axially on the wheel drive shaft or on the wheel drive shaft segment with which said clutch mechanism co-operates, said part being in the form of a clutch disk mounted, on said wheel drive shaft or said wheel drive shaft segment, to be free to rotate and to move axially towards and away from the driven member, said clutch disk being placed, in the activated state, spaced apart from the driven member and in engagement with a part carried by and constrained to rotate with the wheel drive shaft or wheel drive shaft segment, and, in the deactivated state, close to the driven member and decoupled from the part carried by and constrained to rotate with the wheel drive shaft or wheel drive shaft segment.

The clutch disk and the driven member, which is preferably in the form of a toothed wheel, are equipped, on each of their faces, with ramps, the ramps on one face of the disk co-operating, during the activation stage, with the ramps on the driven member so as to move the clutch disk axially in a first direction in which it moves away from the driven member and in which the disk becomes constrained to rotate with the part carried by and constrained to rotate with the wheel drive shaft or the wheel drive shaft segment, the ramps on the other face of the disk co-operating, during the deactivation stage, with ramps on the part carried by and constrained to rotate with the wheel drive shaft or the wheel drive segment, so that, by said clutch disk moving axially in the opposite direction, the wheel drive shaft or the wheel drive shaft segment is put into freewheel mode.

The ramps, on the clutch disk and on the part that is constrained to rotate with the wheel drive shaft or with the wheel drive shaft segment, that are in thrusting contact during the deactivation stage when deactivation is caused by the wheel drive shaft or wheel drive shaft segments being driven in rotation at a speed greater than the speed of rotation of the driven member, and that are configured to cause the disk to move axially towards the driven member are the same as the ramps, on the clutch disk and on the part that is constrained to rotate with the wheel drive shaft or with the wheel drive shaft segment, that are in thrusting contact during the deactivation stage when deactivation is caused by the driven member being driven backwards, and that are configured to cause the disk to move axially towards the driven member.

Thus the solution based on ramps that is described above makes it possible to use the same ramps for each type of deactivation. As a result the overall assembly is simplified.

Preferably, the control means for causing the motor means of the driver member to rotate in the direction in which they drive the driven member in the backwards direction are control means that are actuated automatically.

In particular, said automatically actuated control means include means for directly or indirectly detecting stopping of the rotary drive of the motor driver member, time-delay means configured to measure a predetermined time interval as from detection of stopping, and means for emitting a control signal for driving the motor means in the direction in which the driven member is driven backwards, said means for emitting a signal being configured to emit said control signal after a time interval measured by said time-delay means.

Although the control means for causing the motor means of the inlet shaft to rotate in the direction in which the driven member is driven backwards can be control means that are actuated manually, formed, for example by a push button positioned on the handlebars of the vehicle, the solution of having control means that are actuated automatically is preferred because it avoids any management of the clutch mechanism by the driver of the vehicle.

Preferably, the transmission includes an epicyclic gear train, placed between the motor means and the driver member formed by an inlet shaft, which epicyclic gear train is of the type comprising an inner gear or "sun gear" mounted to be constrained to rotate with the motor means, an outer gear or "ring gear" fastened to the casing, planet gears engaging by meshing with the sun gear and with the ring gear, and a planet carrier threaded over the inlet shaft and mounted to be constrained to rotate with said shaft.

This results in overall compactness.

The invention also provides a walk-behind self-propelled vehicle of the lawn mower type, characterized in that it is equipped with a transmission as described above.

The invention also provides a method of automatically deactivating the clutch mechanism(s) of a transmission of the above-mentioned type, said method being characterized in that, when the driven member is in the non-driven state, said method includes a step consisting in deactivating the clutch mechanism(s) by automatically causing the motor means to move in the direction in which said driven member is driven in rotation backwards.

BRIEF DESCRIPTION OF THE DRAWINGS

The invention can be well understood on reading the following description of embodiments given with reference to the accompanying drawings, in which.

DETAILED DESCRIPTION

As mentioned above, the transmission of the invention is more particularly designed to be applicable to a wheeled vehicle 1, and in particular to a walk-behind wheeled vehicle.

Figure 1:
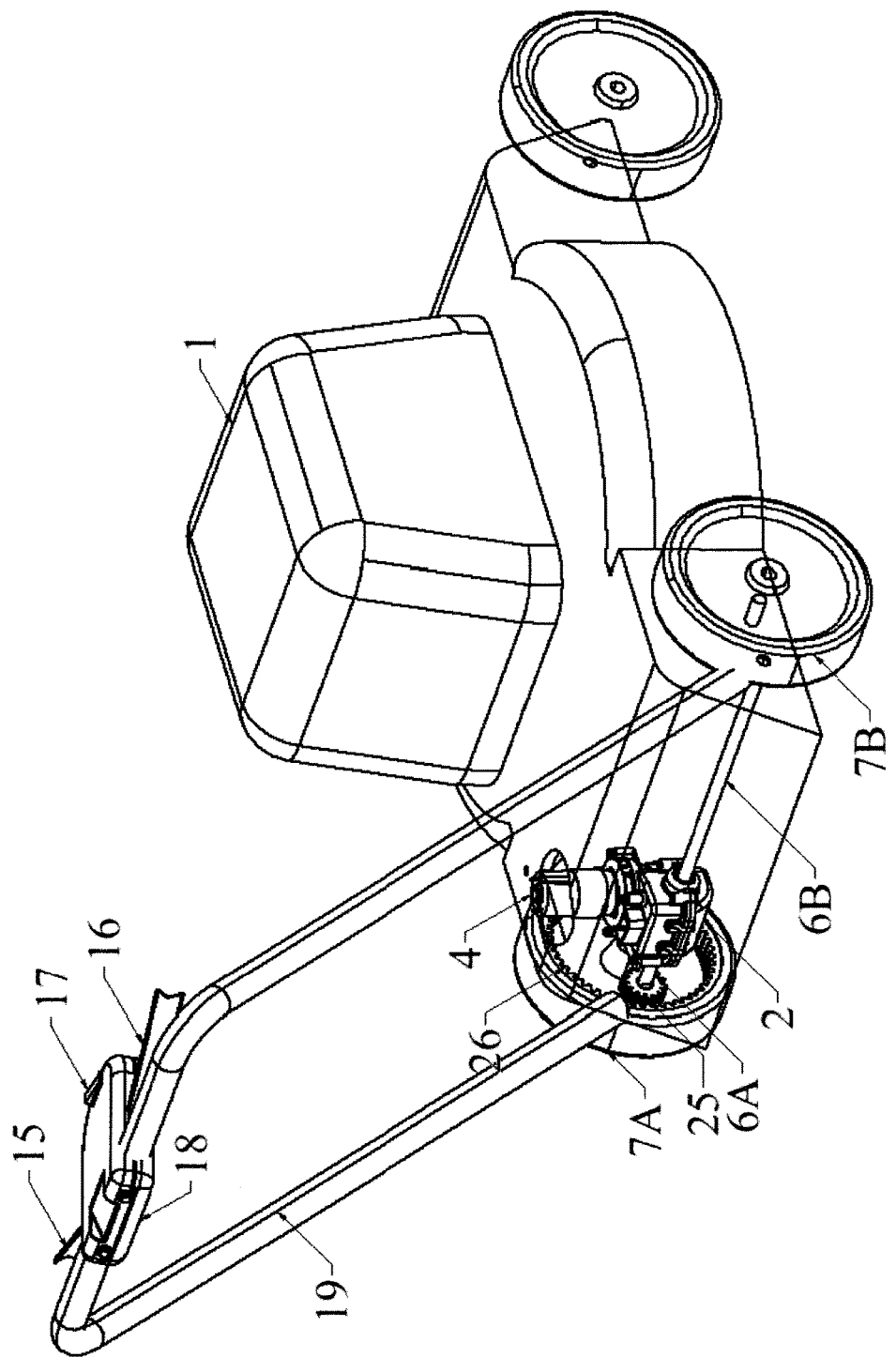
FIG. 1 is a perspective view of a vehicle of the invention.
Figure 2:
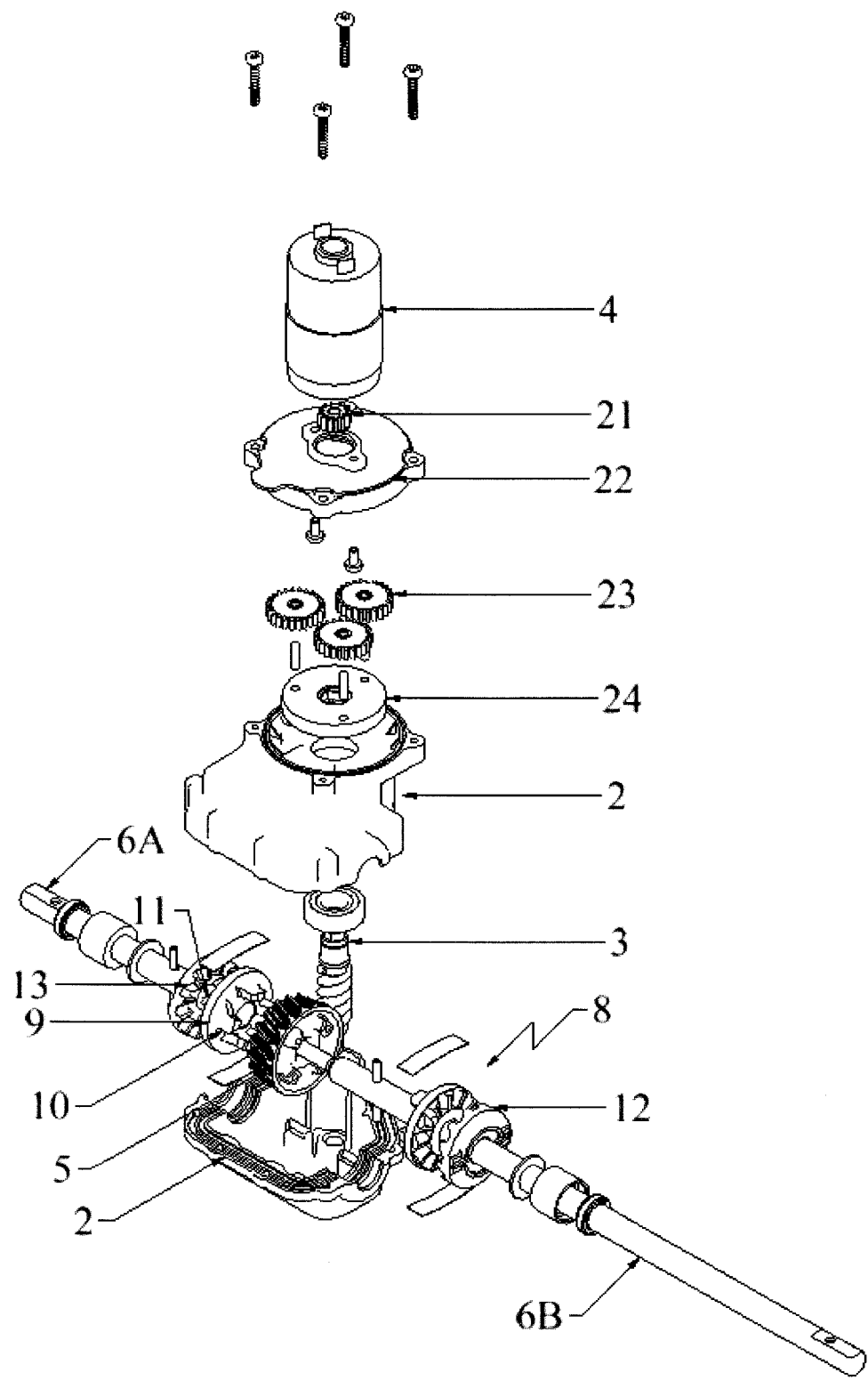
FIG. 2 is a fragmentary exploded view of the component elements of a transmission of the invention.
Figure 3:
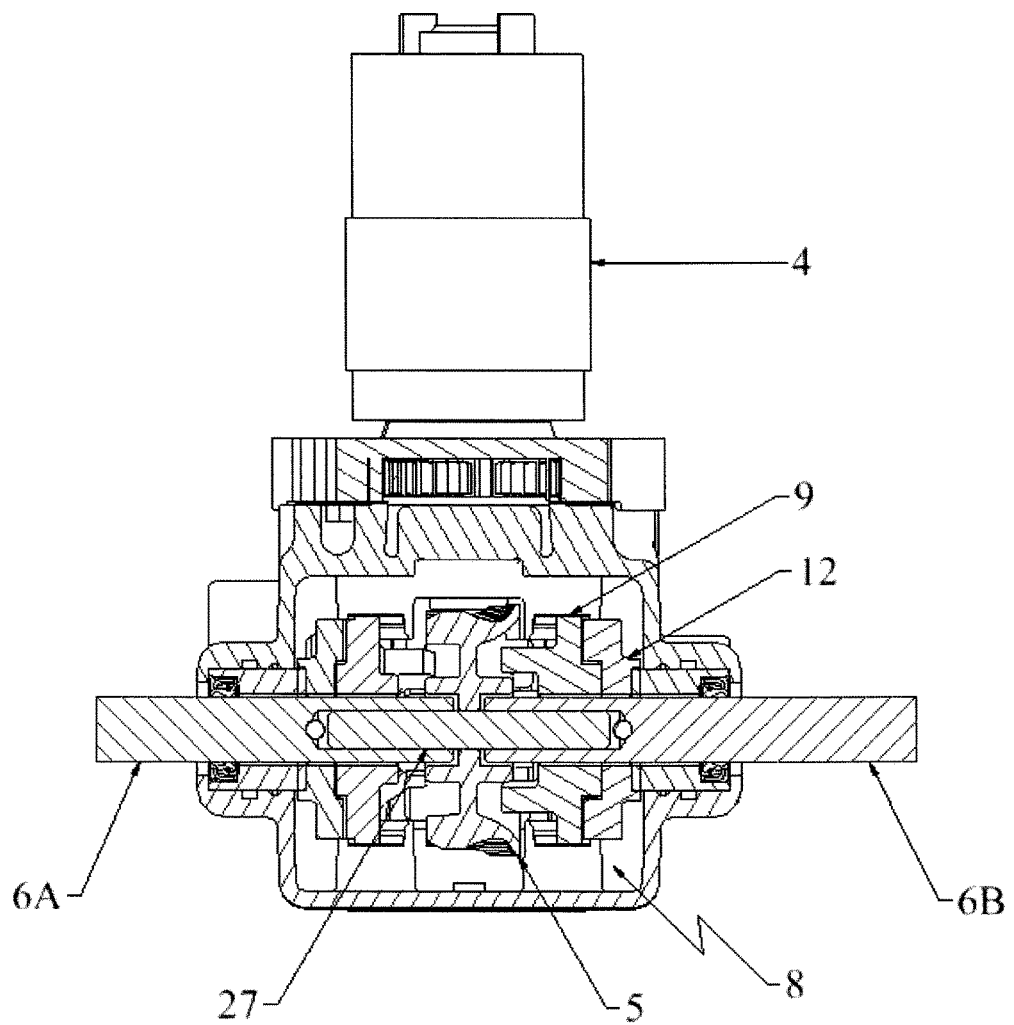
FIG. 3 is a fragmentary longitudinal section view of a transmission of the invention.
Figure 4:
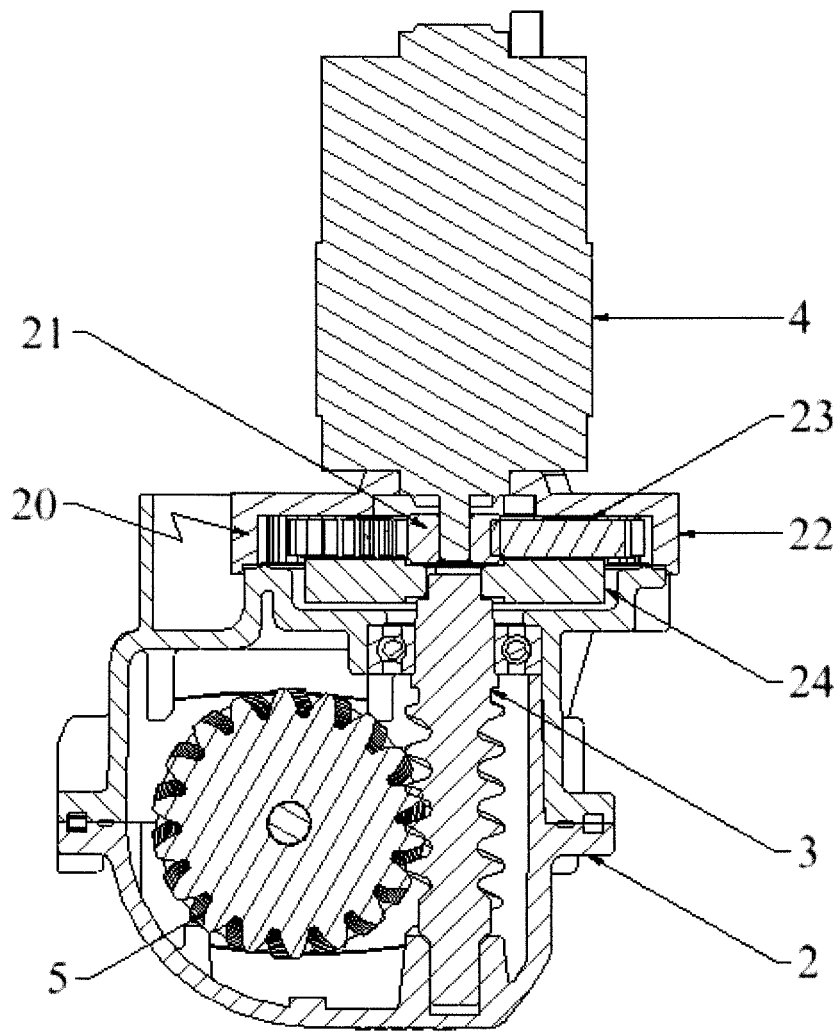
FIG. 4 is a fragmentary cross-section view of a transmission of the invention.

FIG. 1 shows such a transmission as applied to a lawn mower. This lawn mower has a wheeled chassis, the rear wheels of the chassis being shown at 7A, 7B in the figures.

The transmission includes a fixed or stationary casing 2 carried by said wheeled chassis of the vehicle. The casing 2, which is preferably made of a synthetic material, is made up of two half-shells assembled together via a join plane. This casing 2 at least partially houses a driver member 3 formed, in this example, by an inlet shaft in the form of a worm screw. In equivalent manner, said worm screw may be replaced, in particular, by a beveled cylindrical gear.

Said driver member 3 continuously engages by meshing with a driven member 5 formed by a toothed wheel tangential to the worm screw. The driver member 3 is equipped with rotary drive motor means 4.

In the example shown, the motor means 4 of the driver member 3 and the driver member 3 are disposed in alignment.

The motor means 4 are placed above the driver member 3. An epicyclic gear train 20 is provided that is placed between the motor means 4 and the driver member 3 formed by an inlet shaft, and that is of the type having an inner gear or "sun gear" 21 mounted to be constrained to rotate with the motor means 4, an outer gear or "ring gear" 22 fastened to the casing 2, planet gears 23 that engage by meshing with the sun gear 21 and with the ring gear 22, and a planet carrier 24 threaded over the inlet shaft 3 and mounted to rotate with said shaft 3.

The sun gear 21 being driven in rotation drives the planet gears 23 in rotation that engage by meshing with the inside circumferential set of teeth of the ring gear 22. Since the ring gear is a stationary gear fastened to the casing, the planet gears 23, each of which is threaded over a respective spindle of the planet carrier 24, tend to drive the planet carrier 24 in rotation, which planet carrier is threaded over the drive shaft and is mounted to be constrained to rotate with said inlet shaft 3. This results in said inlet shaft 3 being driven in rotation, which shaft itself drives the driven member 5 formed by the toothed wheel in rotation.

In the example shown in FIGS. 1 to 7, the casing 2 also includes, housed at least partially inside the casing, two wheel drive shaft segments 6A, 6B in alignment, each of which is suitable for driving a respective wheel 7A, 7B of a single pair of wheels of the vehicle.

Said shaft segments 6A, 6B are held in alignment by holding means 27 and, in the aligned state, are suitable for being moved in rotation relative to each other. In this example, the holding means 27 are formed by two sleeves threaded over a link pin at respective ones of their ends and receiving respective wheel drive shaft segments at their other ends.

These drive shaft segments extend perpendicularly to the inlet shaft forming the driver member 3. At each of the ends of the wheel drive shaft segments 6A, 6B that project from the transmission casing 2, a respective gear 25 is disposed that is designed to come to engage with a respective gear 26 carried by a respective one of the wheels 7A, 7B of the vehicle. Naturally, other transmission means for transmitting the motion of the wheel drive shaft segment 6A; 6B to the wheel 7A; 7B may be provided without going beyond the ambit of the invention.

The casing 2 also at least partially houses two clutch mechanisms 8, each of which is disposed between the driven member 5 and a respective wheel drive shaft segment 6A, 6B.

One of said clutch mechanisms 8 is suitable for transmitting the motion of the driven member 5 to the wheel drive shaft segment 6A, and the other said clutch mechanisms 8 is suitable for transmitting the motion of the driven member 5 to the wheel drive shaft segment 6B.

Thus, the driven wheel, forming the driven member 5, disposed in alignment with the wheel drive shaft segments, is disposed between two clutch mechanisms, each clutch mechanism 8 being carried, at least partially, by a respective wheel drive shaft segment of a single pair of wheels of the vehicle.

Each clutch mechanism 8 is activated at least by the driven member 5 being driven in rotation in a "forwards" first rotary drive direction, and at least one part of the clutch mechanism shown at 9 in the figures moving axially.

The driven member 5 being driven in rotation in the forwards direction is obtained by control means 15 for controlling the direction of rotation of the motor means 4 of the driver member 3 being actuated in a first direction of rotation corresponding to said forwards direction. The motor means 4 being actuated drives the driver member 3 in rotation, and the driver member then transmits its rotary motion to the driven member 5. In this example, the control means 15 are formed by a pivotally mounted lever coupled to the handlebars of the vehicle.

The part of the clutch mechanism that is axially movable while the driven member 5 is being driven forwards is in the form of a clutch disk 9 that is mounted on the wheel drive shaft, with which said clutch mechanism is suitable for co-operating, to be free to rotate and to be movable axially towards and away from the driven member 5.

On activation under the action of the driven member being driven forwards, said clutch disk is movable in the direction in which it moves away from the driven member 5 until it reaches a position in engagement with a part 12 carried by and constrained to rotate with the wheel drive shaft segment. In the activated state, said clutch disk 9 is thus disposed spaced apart from the driven member 5, i.e. away from the driven member by a distance greater than the distance between it and the driven member when it is in the deactivated state.

The clutch mechanism 8 is also deactivatable by the wheel drive shaft segment 6A, 6B with which it co-operates being driven in rotation in the forwards direction, when the speed of rotation of the wheel drive shaft segment is greater than the speed of rotation of the driven member 5. Speed that is "greater" also covers the situation in which the driven member 3 is not driven in rotation, i.e. is at a standstill.

While the drive inlet shaft 3 is coming to a stop, the inertia of the machine drives the machine to continue to move by a value sufficient to drive the vehicle wheel drive shaft segments 6A, 6B in rotation, and as a result to generate deactivation of the clutch mechanisms 8, as described below.

In the same manner, each clutch mechanism is designed to be deactivated, when the speed of rotation of the wheel drive shaft segment that carries said mechanism is greater than the speed of rotation of the driven wheel.

When the clutch mechanism is in the deactivated state, the wheel of the vehicle and the shaft segment that carries it are free to turn in both directions of rotation. In addition, each wheel of a pair of wheels of the vehicle can turn independently of the other wheel of the vehicle.

Deactivation of the clutch mechanism can also be obtained by the driven member 5 being driven in rotation backwards. The motor means 4 for driving the driver member 3 in rotation are motor means that can be controlled to rotate in two directions of rotation. Said motor means 4 thus include control means 15 for causing the motor means 4 of the driver member 3 to rotate in the direction in which the driven member 5 is driven forwards as described above, and control means 16 for causing the motor means 4 of the driver member 3 to rotate in the direction in which the driven member 5 is driven backwards.

These control means 16 are automatically actuated control means. Naturally, these control means 16 for causing the motor means 4 of the inlet shaft to rotate in the direction in which the driven member 5 is driven backwards could also be manually actuated control means, e.g. merely in the form of a lever positioned on the handlebars as shown. However, the automatic actuation solution is preferred and is also shown. These automatically actuated control means 16 include means 17 for directly or indirectly detecting stopping of the rotary drive of the motor driver member 3, time-delay means 18 configured to measure a predetermined time interval as from detection of stopping, and means 19 for emitting a control signal for driving the motor means 4 in the direction in which the driven member 5 is driven backwards, said means 19 for emitting a signal being configured to emit said control signal after a time interval measured by said time-delay means 18.

In order to make activation and such deactivation of the clutch means possible in all of the situations described above, the clutch disk 9 and the driven member 5, which, in this example is in the form of a toothed wheel, are provided with ramps on each of their faces. During the activation stage, the ramps 10 on one face of the disk 9 co-operate with the ramps 14 on the driven member 5 to move the clutch disk 9 axially in a first direction in which it moves away from the driven member 5 and in which the disk 9 comes to be constrained to rotate with the part 12 carried by and constrained to rotate with the wheel drive shaft segment 6A, 6B that co-operates with said clutch mechanism. During the deactivation phase, the ramps 11 on the other face of the disk 9 co-operate with the ramps 13 on the part 12 carried by and constrained to rotate with the wheel drive shaft segment 6A, 6B, by moving said clutch disk 9 axially in the opposite direction, to cause the wheel drive shaft segment 6A; 6B with which the clutch mechanism is suitable for co-operating to be put in freewheel mode.

In this example, the ramps of the driven member 5 and of the clutch disk 9 are formed by respective ones of the flanks of crenellations or teeth projecting from said faces.

Figure 5:
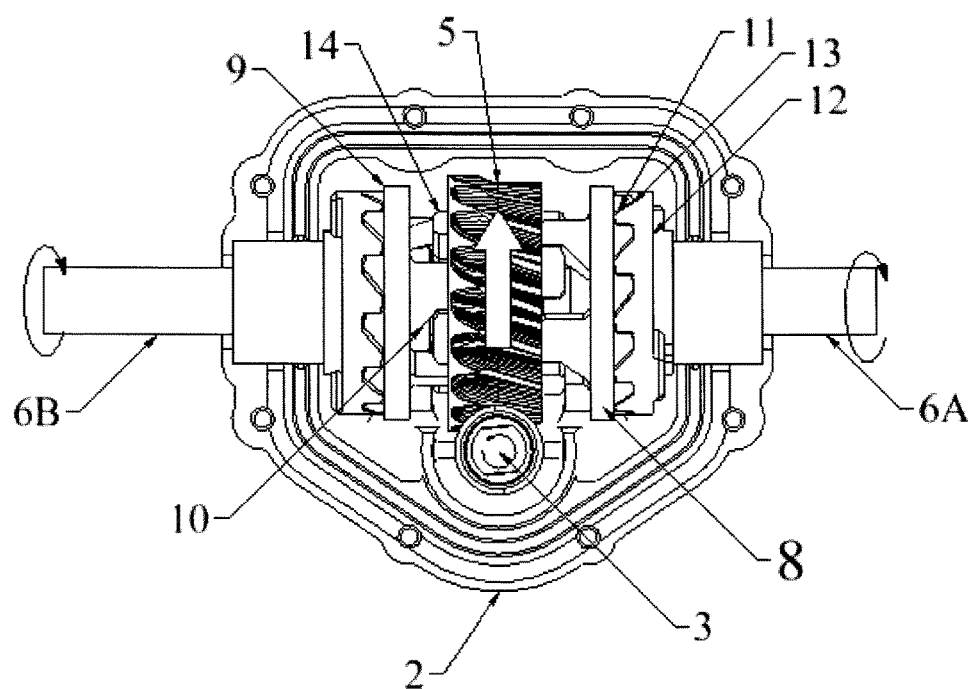
FIGS. 5 to 7 are section views of the casing shown respectively in the position in which both of the clutches are declutched, with the driven member being driven forwards, in the position in which one of the clutches is clutched and the other clutch is declutched, the driven member being driven forwards, and in the position in which both clutches are declutched, with the driven member being driven backwards.
Figure 6:
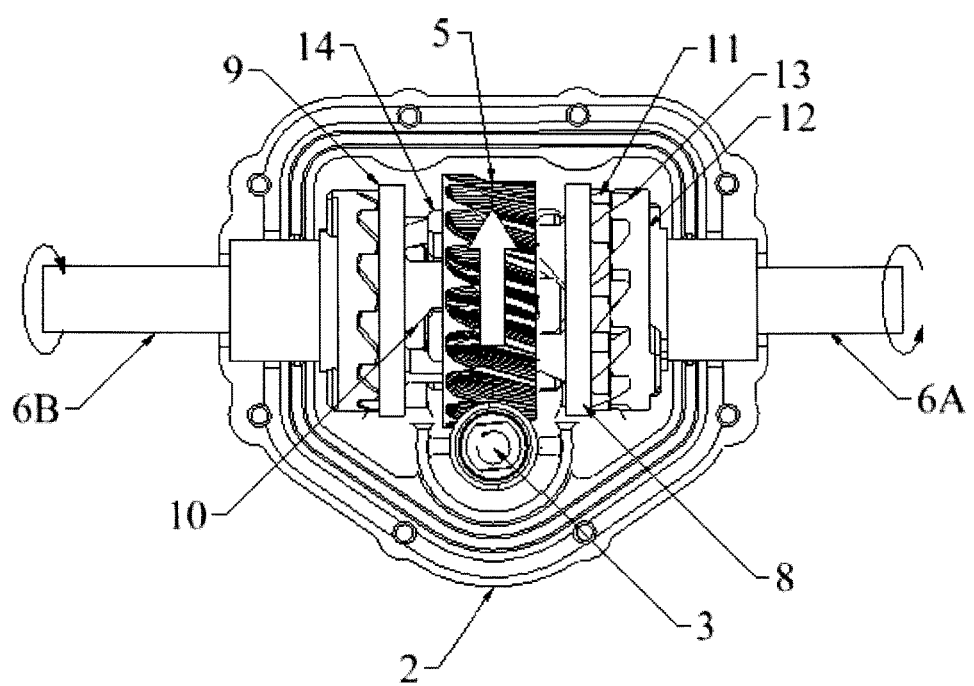
Figure 7:
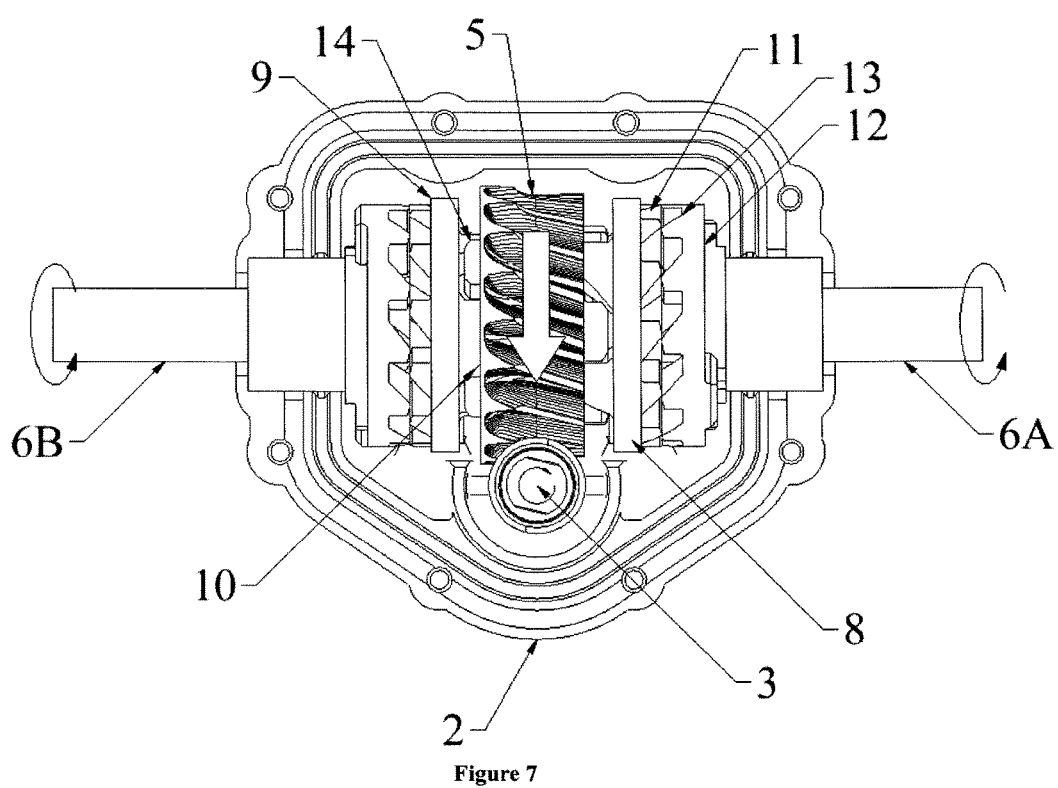

In the example shown in FIGS. 5 to 7, on each of its faces, the toothed wheel constituting the driven member 5 has a ring of teeth with each tooth having two flanks parallel to the axis of rotation of the wheel drive shaft, each flank being connected to the top of the tooth via a bevel segment.

On its face facing towards the driven member 5, the clutch disk 9 has a ring of teeth, with each tooth having a flank parallel to the axis of rotation of the wheel drive shaft segments and an inclined flank forming an angle with said axis of rotation. The inclined flank is formed by the ramp shown at 10 in the figures. This flank is the flank that is stressed while the driven member 5 is being driven forwards by coming into thrusting contact with a tooth of the driven member 5 so as to cause the clutch disk to move axially away from the driven member 5. The other face of the disk, i.e. the face that faces towards the part 12 that is constrained to rotate with the wheel drive shaft segment and that, in this example, is formed by a wheel having ramps, likewise has a ring of teeth, each of which has one straight flank and one inclined flank.

The part 12 or wheel constrained to rotate with the wheel drive shaft segment also has a ring of teeth, in which each tooth has one of its flanks inclined, shown at 13 in the figures, the other of its flanks straight. For each tooth of the disk and of the part 12, a straight flank of a tooth on the disk co-operates with a straight flank of the part 12 constrained to rotate with the wheel drive shaft segment while the driven member 5 is being driven forwards, and when the clutch disk 9 is spaced apart from the driven member 5. This co-operation by thrusting contact continues so long as the drive speed at which the wheel drive shaft segment is driven in rotation is less than the speed of the driven member 5.

When the speed at which the wheels are driven in rotation becomes greater than the speed of rotation of the driven member 5, e.g. while going round a bend with the wheel of the shaft forming the wheel that is on the outside of said bend, the drive shaft segment and its part 12 become driving so that each tooth of the part 12 co-operates at its ramp-forming inclined flank, shown at 13 in the figures, by thrusting contact with a respective one of the ramp-forming inclined flanks, shown at 11, of the teeth of the clutch disk so as to cause the clutch disk to move axially towards the driven member 5 until said ramps reach a decoupled position corresponding to the clutch mechanism being in the deactivated state.

When the driven member 5 is driven backwards, as shown in FIG. 7, after the direction of rotary drive of the driver member 3 has been reversed, it is, once again, the ramps 13 and 11 formed by the inclined flanks of the teeth of the clutch disk and of the part 12 mounted to be constrained to rotate with the wheel drive shaft segment that are in thrusting contact and that cause the clutch disk to move axially towards the driven member 5 until said ramps of the disk and of the part 12 reach a decoupled position corresponding to the clutch mechanism being in the deactivated state.

This axial movement is caused when the range of rotary drive of the driven member 5 extends over one turn or over less than one turn of rotary drive of said driven member 5 as a function of the configurations of the ramps.

The relative speed variation between the clutch disk 9 and the part 12 constrained to rotate with the wheel drive shaft segment thus makes it possible, automatically, when the part 12 becomes driving, for the clutch mechanism to go over to the deactivated state while the driven member 5 is being driven forwards, while the configuration of the ramps automatically results in deactivation while the driven member 5 is being driven backwards.

Figure 8:
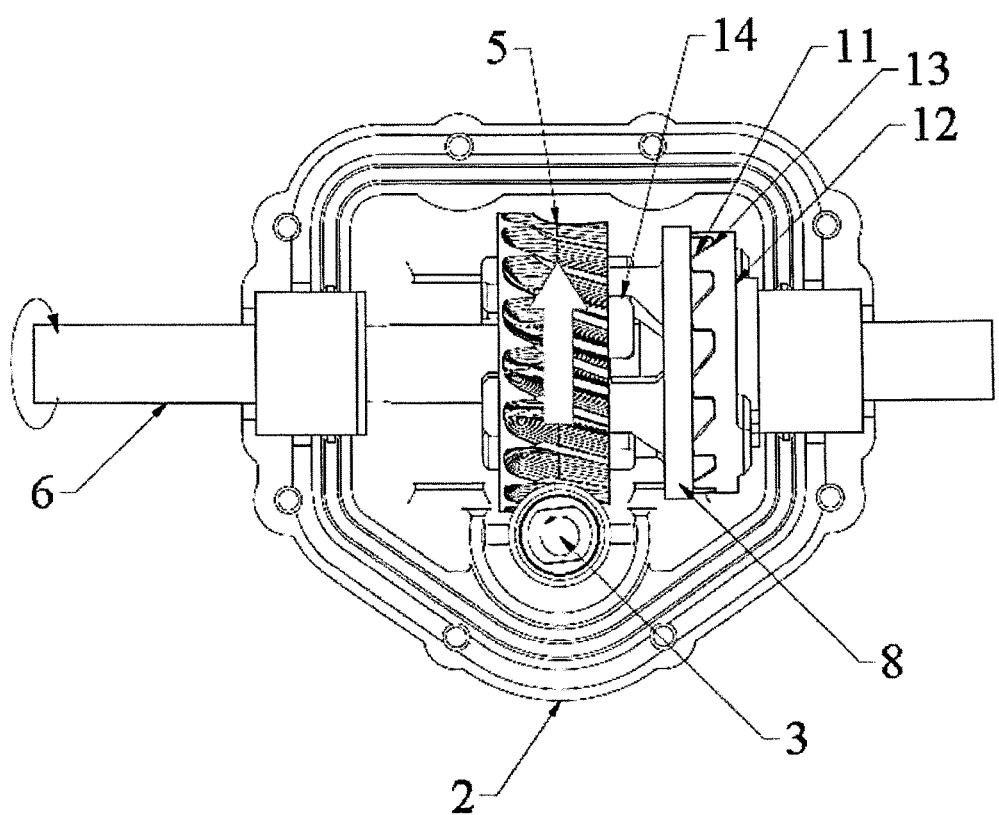
FIGS. 8 and 9 are sections views of the casing equipped with a drive shaft for driving the wheels that is in one piece, respectively in the clutched position (FIG. 8) and in the declutched position (FIG. 9).
Figure 9:
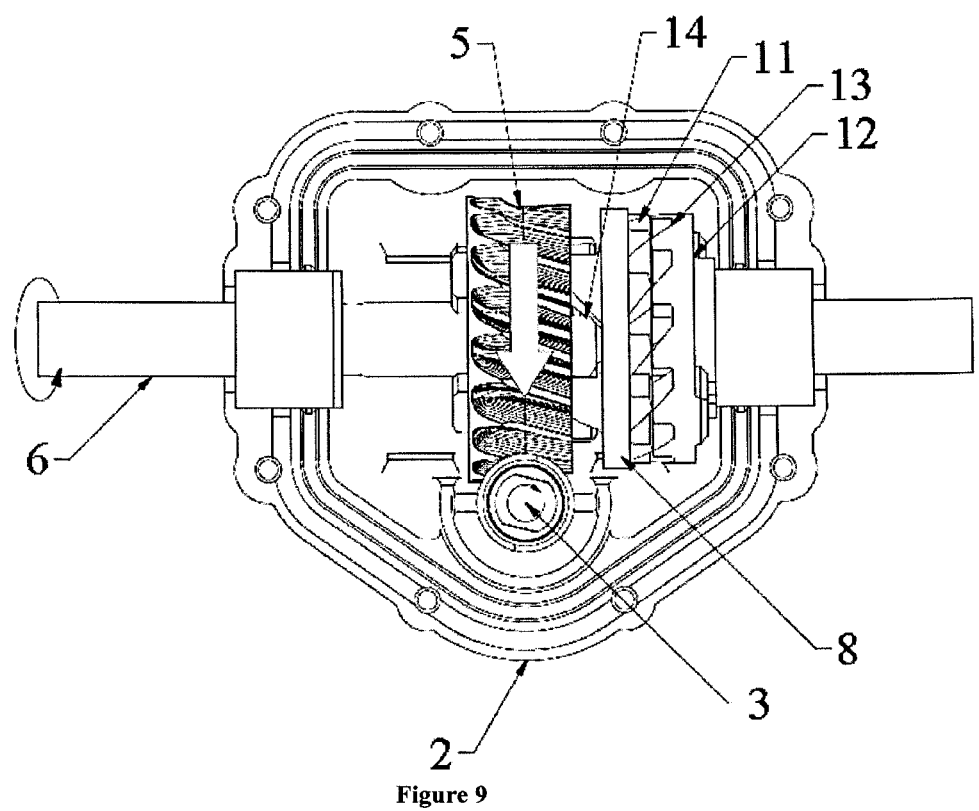

FIG. 8 shows a variant of the invention in which the wheel drive shaft 6 is in one piece rather than being formed of shaft segments 6A, 6B. In this situation, the transmission has a single clutch mechanism 8 that operates similarly to the clutch mechanism described above for a shaft segment, so that the above-description applies in the same manner to FIG. 8.

Due to operation being as described above, and to the presence of control means 16 for causing the motor means of the driver member to rotate in the direction in which the driven member is driven backwards, which control means are actuated automatically as soon as the vehicle has been stopped for beyond a predetermined time interval, the driven member 5 is driven backwards by the motor means via the driver member so that, on stopping, the deactivation of the clutch mechanism takes place automatically, allowing the driver to move the vehicle merely by pushing it forwards, or by causing it to be driven backwards, without having to overcome the mechanical resistance that would result from the clutch mechanisms being activated, and without any risk of breaking said mechanisms.

The invention claimed is:
1. A transmission for a walk-behind wheeled vehicle, the transmission comprising:
   at least one casing at least partially housing a driver member, equipped with rotary drive motor means, a rotary driven member in the form of a toothed wheel, continuously engaging with the motor driver member, wheel drive means for driving both wheels of a single pair of wheels of the vehicle, said wheel drive means having wheel drive shaft made in one piece or made up of at least two wheel drive shaft segments in alignment, each of which is suitable for driving a respective wheel of the single pair of wheels of the vehicle, and a clutch mechanism disposed between the wheel drive shaft or each of the wheel drive shaft segments and the driven member, the clutch mechanism or mechanisms being activated by the driven member being driven in rotation in a forwards first rotary drive direction, and deactivatable by the wheel drive shaft or the wheel drive shaft segment with which it co-operates being driven in rotation forwards, when the speed of rotation of the wheel drive shaft or of the wheel drive shaft segment is greater than the speed of rotation of the driven member, the wheel drive shaft or each wheel drive shaft segment being free to turn in either of its directions of rotation when the corresponding clutch mechanism is in the deactivated state, wherein the rotary drive motor means for driving the driver member in rotation, and therefore for driving the driven member in rotation, are motor means that can be controlled to rotate in two directions of rotation and that are suitable not only for driving the driven member in rotation in the forwards direction, but also for driving the driven member in rotation in a backwards second direction that is opposite to said first direction of rotation, and in that the or each clutch mechanism is of the type that is deactivatable solely by the driven member being driven in rotation in the backwards direction.

2. A transmission for a vehicle according to claim 1, wherein the clutch mechanism or mechanisms are activated by the driven member being driven in rotation in a forwards first direction of rotation, and by at least one part of the clutch mechanism moving axially on the wheel drive shaft or on the wheel drive shaft segment with which said clutch mechanism co-operates, said part being in the form of a clutch disk mounted, on said wheel drive shaft or said wheel drive shaft segment, to be free to rotate and to move axially towards and away from the driven member, said clutch disk being placed, in the activated state, spaced apart from the driven member and in engagement with a part carried by and constrained to rotate with the wheel drive shaft or wheel drive shaft segment, and, in the deactivated state, close to the driven member and decoupled from the part carried by and constrained to rotate with the wheel drive shaft or wheel drive shaft segment.

3. A transmission for a vehicle according to claim 2, wherein the clutch disk and the driven member in the form of a toothed wheel, are equipped, on each of their faces, with ramps, the ramps on one face of the disk co-operating, during the activation stage, with the ramps on the driven member so as to move the clutch disk axially in a first direction in which it moves away from the driven member and in which the disk becomes constrained to rotate with the part carried by and constrained to rotate with the wheel drive shaft or the wheel drive shaft segment, the ramps on the other face of the disk co-operating, during the deactivation stage, with ramps on the part carried by and constrained to rotate with the wheel drive shaft or the wheel drive segment, so that, by said clutch disk moving axially in the opposite direction, the wheel drive shaft or the wheel drive shaft segment is put into freewheel mode.

4. A transmission for a vehicle according to claim 3, wherein at least some of the ramps of the driven member and of the clutch disk are formed by respective ones of the flanks of crenellations or teeth projecting from said faces.

5. A transmission for a vehicle according to claim 1, wherein a control means, for causing the motor means of the driver member to rotate in the direction in which they drive the driven member in the backwards direction, are control means that are actuated automatically.

6. A transmission for a vehicle according to claim 5, wherein said automatically actuated control means include means for directly or indirectly detecting stopping of the rotary drive of the motor driver member, time-delay means configured to measure a predetermined time interval as from detection of stopping, and means for emitting a control signal for driving the motor means in the direction in which the driven member is driven backwards, said means for emitting a signal being configured to emit said control signal after a time interval measured by said time-delay means.

7. A transmission for a vehicle according to claim 1, wherein the control means for causing the motor means of the inlet shaft to rotate in the direction in which they drive the driven member in the backwards direction are control means that are actuated manually.

8. A transmission for a vehicle according to claim 1, wherein the transmission includes an epicyclic gear train, placed between the motor means and the driver member formed by an inlet shaft, which epicyclic gear train is of the type comprising an inner gear called a sun gear mounted to be constrained to rotate with the motor means, an outer gear called a ring gear fastened to the casing, planet gears engaging by meshing with the sun gear and with the ring gear, and a planet carrier threaded over the inlet shaft and mounted to be constrained to rotate with said shaft.

9. A transmission for a vehicle according to claim 1, the motor means of the driver member and the driver member are placed in alignment.

10. A walk-behind self-propelled wheeled vehicle such as a lawn mower, wherein said walk-behind self propelled wheeled vehicle is equipped with a transmission according to claim 1.

* * * * *